(12) United States Patent
Williams et al.

(10) Patent No.: US 11,992,798 B2
(45) Date of Patent: *May 28, 2024

(54) HVAC HOME AIR FILTER

(71) Applicant: K&N Engineering, Inc., Riverside, CA (US)

(72) Inventors: Steve Williams, Cherry Valley, CA (US); Jere James Wall, Helendale, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,937

(22) Filed: Jun. 3, 2022

(65) Prior Publication Data
US 2022/0370943 A1 Nov. 24, 2022

Related U.S. Application Data

(63) Continuation of application No. 16/839,874, filed on Apr. 3, 2020, now Pat. No. 11,351,495, which is a
(Continued)

(51) Int. Cl.
*B01D 46/00* (2022.01)
*B01D 39/08* (2006.01)
(Continued)

(52) U.S. Cl.
CPC .......... *B01D 46/10* (2013.01); *B01D 39/083* (2013.01); *B01D 39/086* (2013.01); *B01D 41/04* (2013.01);
(Continued)

(58) Field of Classification Search
CPC .......... B01D 46/10; B01D 46/0005; B01D 46/0006; B01D 46/42; B01D 41/04;
(Continued)

(56) References Cited

U.S. PATENT DOCUMENTS 6,464,745 B2 * 10/2002 Rivera ............... B01D 46/523
55/497
6,979,361 B2 * 12/2005 Mihayiov .......... B01D 46/0086
96/417
(Continued)

*Primary Examiner* — Minh Chau T Pham
(74) *Attorney, Agent, or Firm* — Rutan & Tucker LLP; Hani Z. Sayed

(57) ABSTRACT

An apparatus and a method are provided for a heating, ventilation, and air conditioning (HVAC) home air filter to remove airborne molecular contaminants and volatile organic compounds (VOCs) from air within residential spaces. The HVAC home air filter a supportive frame having a shape and size suitable to orient the HVAC home air filter within a residential HVAC system. A filter medium is retained within the supportive frame to remove the airborne molecular contaminants and VOCs from air flowing through the residential HVAC system. The filter medium is a combination of media layers configured to exhibit a relatively high filtration efficiency and a low air pressure drop across the filter medium. The supportive frame comprises a plurality of elongate sections and corner sections disposed along perimeter edges of the filter medium to support the filter medium within the residential HVAC system so as direct air through the filter medium.

7 Claims, 3 Drawing Sheets

Related U.S. Application Data continuation of application No. 15/207,025, filed on Jul. 11, 2016, now Pat. No. 10,632,411, which is a continuation-in-part of application No. 14/974,092, filed on Dec. 18, 2015, now Pat. No. 10,434,466, which is a continuation-in-part of application No. 14/668,772, filed on Mar. 25, 2015, now Pat. No. 9,701,178.

(51) Int. Cl.
| | | |
|---|---|---|
| *B01D 41/04* | (2006.01) | |
| *B01D 46/04* | (2006.01) | |
| *B01D 46/10* | (2006.01) | |
| *B01D 46/52* | (2006.01) | |
| *B01D 46/66* | (2022.01) | |
| *F24F 8/10* | (2021.01) | |
| *F24F 8/192* | (2021.01) | |
| *F24F 8/108* | (2021.01) | |

(52) U.S. Cl.
CPC ..... *B01D 46/0005* (2013.01); *B01D 46/0028* (2013.01); *B01D 46/0032* (2013.01); *B01D 46/0035* (2013.01); *B01D 46/0038* (2013.01); *B01D 46/0097* (2013.01); *B01D 46/521* (2013.01); *B01D 46/66* (2022.01); *F24F 8/10* (2021.01); *F24F 8/192* (2021.01); *B01D 2279/50* (2013.01); *F24F 8/108* (2021.01)

(58) Field of Classification Search
CPC ............................ B01D 39/14; B01D 39/1676; B01D 2279/50; B01D 2279/10; B01D 2279/1208; B01D 2275/403; F24F 8/10
USPC ......... 55/486, 496, 497, 498, 379, 501, 511, 55/DIG. 31
See application file for complete search history.

(56) References Cited

U.S. PATENT DOCUMENTS

| | | | | |
|---|---|---|---|---|
| 8,500,839 | B2 * | 8/2013 | Crabtree | B01D 46/521 55/497 |
| 9,701,178 | B2 * | 7/2017 | Williams | B60H 3/0078 |
| 10,434,466 | B2 * | 10/2019 | Williams | B01D 39/083 |
| 10,632,411 | B2 * | 4/2020 | Williams | B01D 46/0028 |
| 11,351,495 | B2 * | 6/2022 | Williams | B01D 46/66 |
| 2002/0100264 | A1 * | 8/2002 | Rivera | B01D 46/10 55/497 |
| 2007/0175192 | A1 * | 8/2007 | Niakan | B01D 46/521 55/486 |

* cited by examiner

HVAC HOME AIR FILTER

PRIORITY

This application is a continuation of U.S. patent application Ser. No. 16/839,874 filed Apr. 3, 2020, now U.S. Pat. No. 11,351,495 B2 and U.S. patent application Ser. No. 15/207,025 filed on Jul. 11, 2016, now issued as U.S. Pat. No. 10,632,411 and continuation-in-part of, and claims the benefit of, U.S. patent application Ser. No. 14/974,092, entitled "HVAC System Air Filter," filed on Dec. 18, 2015, now issued as U.S. Pat. No. 10,434,466 which is a continuation-in-part of, and claims the benefit of, U.S. patent application Ser. No. 14/668,772, entitled "Cabin Air Filter," filed on Mar. 25, 2015, issued as U.S. Pat. No. 9,701,178 the entirety of each of said applications is incorporated herein by reference.

FIELD

The field of the present disclosure generally relates to filter devices. More particularly, the field of the invention relates to an apparatus and a method for a HVAC system air filter to remove airborne molecular contaminants and volatile organic compounds from air within interior building spaces.

BACKGROUND

Heating, ventilation, and air conditioning (HVAC) systems generally operate to provide optimal indoor air quality to occupants within interior building spaces. HVAC systems achieve optimal indoor air quality by conditioning air, removing particle contaminants by way of ventilation and filtration of air, and providing proper building pressurization.

While there are many different HVAC system designs and operational approaches, and each building design is unique, HVAC systems generally share a few basic design elements. For example, outside air ("supply air") generally is drawn into a HVAC system of a building through an air intake. Once in the HVAC system, the supply air is filtered to remove particle contaminants, then heated or cooled, and then circulated throughout the building by way of an air distribution system. Many air distribution systems comprise a return air system configured to draw air from interior building spaces and return the air ("return air") to the HVAC system. The return air is then mixed with supply air and then filtered, conditioned, and circulated throughout the building. Often times, a portion of the air circulating within the building may be exhausted to the exterior of the building so as to maintain a desired barometric pressure within the building.

As will be appreciated, the effectiveness of the HVAC system to provide an optimal indoor air quality depends largely on an ability of an air filter within the HVAC system to remove particle contaminants from the air within the building. A HVAC system air filter typically comprises fibrous materials configured to remove solid particulates, such as dust, pollen, mold, and bacteria from the air passing through the HVAC system. A drawback to conventional HVAC system air filters, however, is that highly effective air filters capable of removing very small contaminants, such as airborne molecular contaminants and volatile organic compounds (VOCs), tend to restrict airflow through the air filter, thereby making the HVAC system work harder and consume more energy.

Another drawback to conventional HVAC system air filters is that dirty or clogged air filters typically are removed from the HVAC system and discarded, and a new HVAC system air filter is then installed. Further, HVAC system air filters may be unnecessarily discarded and replaced in an effort to increase HVAC system airflow and thus decrease operation costs. Considering that there are millions of buildings with HVAC systems throughout the world, the volume of discarded air filters that could be eliminated from landfills is a staggering number. What is needed, therefore, is a HVAC system air filter that may be periodically cleaned and reused, and is configured for removing airborne molecular contaminants and VOCs without obstructing air flow through the HVAC system.

SUMMARY

An apparatus and a method are provided for a heating, ventilation, and air conditioning (HVAC) home air filter to remove airborne molecular contaminants and volatile organic compounds (VOCs) from air within residential spaces. The HVAC home air filter comprises a supportive frame having a shape and size suitable to orient the HVAC home air filter within a residential HVAC system. A filter medium is retained within the supportive frame and configured to remove the airborne molecular contaminants and VOCs from air flowing through the residential HVAC system. The filter medium preferably is disposed between a first screen and a second screen, at least one of which comprising nylon, to prevent bowing of the filter medium due to air pressure. The filter medium generally comprises a combination of one or more media layers, each of which having unique filtration properties, such that the combination of media layers exhibits a relatively high filtration efficiency and a relatively low air pressure drop across the filter medium. The supportive frame comprises a plurality of elongate sections and corner sections disposed along perimeter edges of the filter medium and is configured to orient the filter medium within the residential HVAC system.

In an exemplary embodiment, a heating, ventilation, and air conditioning (HVAC) home air filter to remove airborne molecular contaminants and volatile organic compounds (VOCs) from air within residential spaces comprises a supportive frame comprising a shape and size suitable for orienting the HVAC home air filter within a residential HVAC system; and a filter medium retained within the supportive frame and is configured to remove the airborne molecular contaminants and VOCs from air flowing through the residential HVAC system.

In another exemplary embodiment, the filter medium is comprised of paper, foam, cotton, spun fiberglass, or other known filter materials, woven or non-woven material, synthetic or natural, or any combination thereof. In another exemplary embodiment, the filter medium is pleated, or otherwise shaped, or contoured so as to increase the surface area for passing the air stream to be cleaned. In another exemplary embodiment, the filter medium is disposed between a first screen and a second screen, at least one of the first screen and the second screen comprising nylon, and wherein the supportive frame comprises a plurality of elongate sections and corner sections disposed along perimeter edges of the filter medium and configured to orient the filter medium within the residential HVAC system.

In another exemplary embodiment, the filter medium comprises a combination of one or more media layers, each of the one or more media layers having unique filtration properties, such that the combination of one or more media layers exhibits a relatively high filtration efficiency and a relatively low air pressure drop across the filter medium. In another exemplary embodiment, the filter medium exhibits a filtration efficiency of at least 38% and a basis filtration efficiency of substantially 43.3%. In another exemplary embodiment, the combination of one or more media layers comprises a first media layer and a second media, the first media layer comprising a fiber density that is relatively lower than a fiber density of the second media layer. In another exemplary embodiment, the filter medium comprises a fiber density that generally increases in a direction of air flow through the filter medium. In another exemplary embodiment, the filter medium comprises a weight ranging between substantially 96.6 grams per square meter ($gm/m^2$) and 106.8 $gm/m^2$. In another exemplary embodiment, the filter medium comprises a thickness ranging between substantially 2.54 mm and substantially 4.57 mm. In another exemplary embodiment, the filter medium comprises an air permeability ranging between substantially 2.08 cubic meters of air per second per square meter of the filter medium ($m^3/s-m^2$) and substantially 2.44 $m^3/s-m^2$.

In another exemplary embodiment, the filter medium comprises a combination of one or more media layers, each of the one or more media layers having a unique appearance, the combination of one or more media layers being configured to exhibit a relatively high filtration efficiency and a relatively low air pressure drop across the filter medium, and the unique appearance being configured to indicate a preferred direction of air flow through the filter medium. In another exemplary embodiment, the combination of one or more media layers comprises a first media layer and a second media, the first media layer comprising a gold color and the second media layer comprising a white color, the gold color indicating an air entry side of the filter medium, and the white color which indicating an air exit side of the filter medium.

In another exemplary embodiment, an electrostatic portion of the filter medium is configured to electrostatically attract and agglomerate particle contaminants within the air flowing through the residential HVAC system. In another exemplary embodiment, the electrostatic portion of the filter medium comprises at least some fibers that are treated with a coating of antimicrobial molecules configured to destroy microbes, the antimicrobial molecules comprising positively charged molecules distributed around a circumference of each of the at least some fibers and configured to cooperate with polarized fibers within the filter medium. In another exemplary embodiment, the filter medium is configured to electrostatically entrap particle contaminants and release a fragrance into the air flowing through the residential HVAC system, the filter medium comprising antimicrobial molecules configured to destroy entrapped particle contaminants, the filter medium comprising at least one substance configured to release the fragrance into air passing through the filter medium, wherein the at least one substance is located downstream of the antimicrobial molecules so as to avoid destruction of aromatic molecules by the antimicrobial molecules.

In an exemplary embodiment, a method for cleaning a heating, ventilation, and air conditioning (HVAC) home air filter which is installed within a residential HVAC system, the method comprises removing the HVAC home air filter from the residential HVAC system; clearing the residential HVAC system of any debris trapped therein; flushing contaminants from a filter medium of the HVAC home air filter by way of a water hose; allowing the water and contaminants to drain from the filter medium; and allowing the filter medium to dry.

In another exemplary embodiment, removing the HVAC home air filter further comprises disassembling a supportive frame comprising the HVAC home air filter and removing the filter medium therefrom. In another exemplary embodiment, flushing contaminants from the filter medium further comprises using a solvent to remove a filter oil composition from the filter medium. In another exemplary embodiment, allowing the filter medium to dry further comprises applying a filter oil composition to the filter medium.

BRIEF DESCRIPTION OF THE DRAWINGS

The drawings refer to embodiments of the present disclosure in which.

Figure 1:
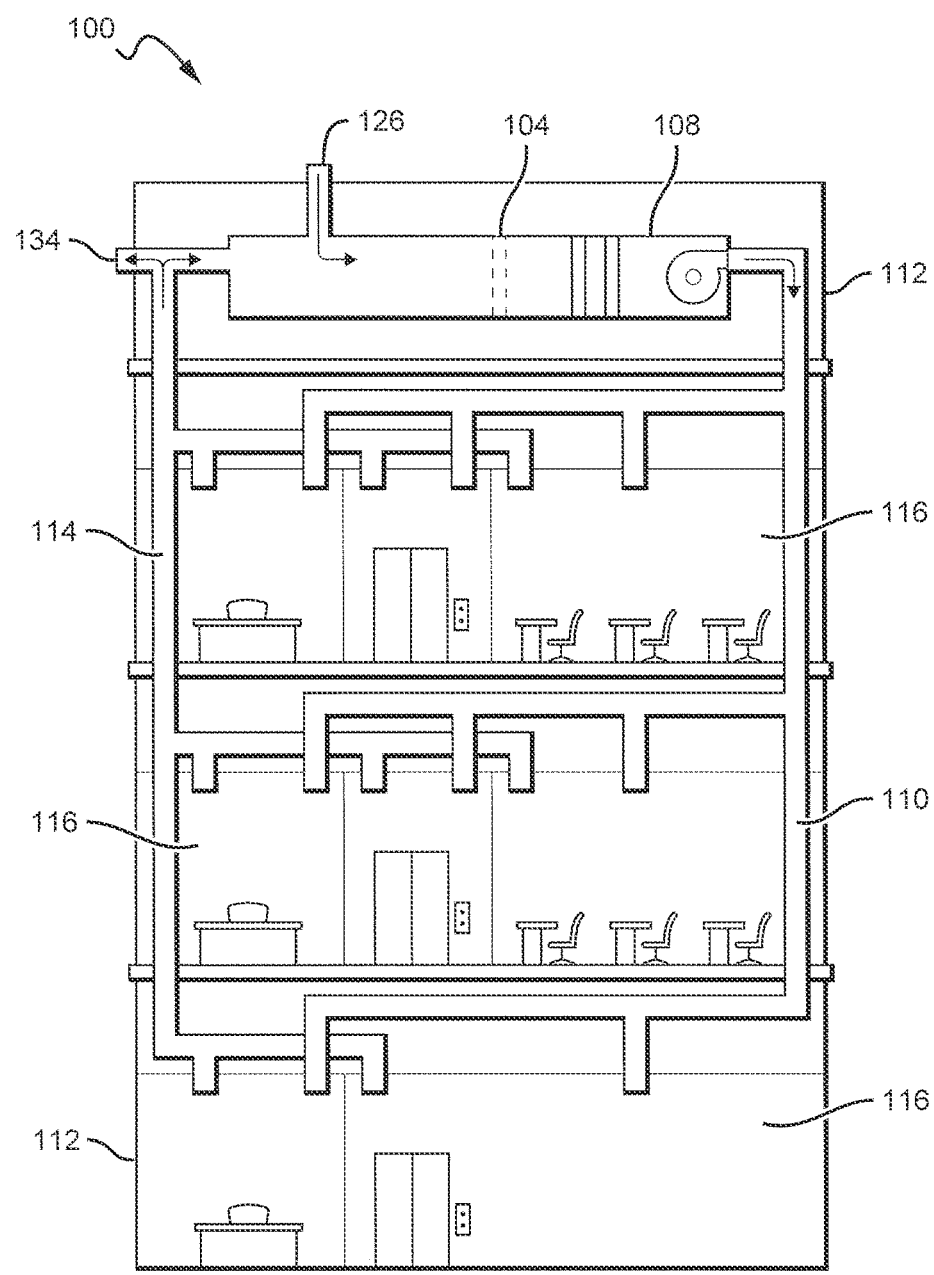
FIG. 1 illustrates a cross-sectional view of an exemplary use environment wherein a HVAC system air filter is incorporated into a HVAC system of a building, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first portion," may be made. However, the specific numeric reference should not be interpreted as a literal sequential order but rather interpreted that the "first portion" is different than a "second portion." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a heating, ventilation, and air conditioning (HVAC) home air filter to remove airborne molecular contaminants and volatile organic compounds (VOCs) from air within residential spaces. The HVAC home air filter comprises a supportive frame having a shape and size suitable to orient the HVAC home air filter within a residential HVAC system. A filter medium is retained within the supportive frame and configured to remove the airborne molecular contaminants and VOCs from air flowing through the residential HVAC system. The filter medium generally comprises a combination of one or more media layers configured to exhibit a relatively high filtration efficiency and a relatively low air pressure drop across the filter medium. The supportive frame comprises a plurality of elongate sections and corner sections disposed along perimeter edges of the filter medium and is configured to orient the filter medium within the residential HVAC system, such that air flowing through the residential HVAC system is passed through the filter medium.

FIG. 1 illustrates an exemplary use environment 100 wherein an air filter 104 is incorporated into a HVAC system 108 of a building 112 so as to clean an air stream drawn through the air filter 104. Although the building 112 illustrated in FIG. 1 comprises a multi-story office building, it should be understood that the building 112 may comprise any of various inhabitable structures, such as residential homes, apartments, condominiums, and the like. After passing through the air filter 104, the air stream is routed into one or more building spaces 116 by way of a supply ductwork 110. Air within the building spaces 116 is routed back to the HVAC system 108 by way of a return ductwork 114. It will be appreciated that the building 112 may comprise multiple stories, each of which stores including one or more building spaces 116, as illustrated in FIG. 1, or may comprise a single story building, including but not limited to a detached residential home.

Figure 2:
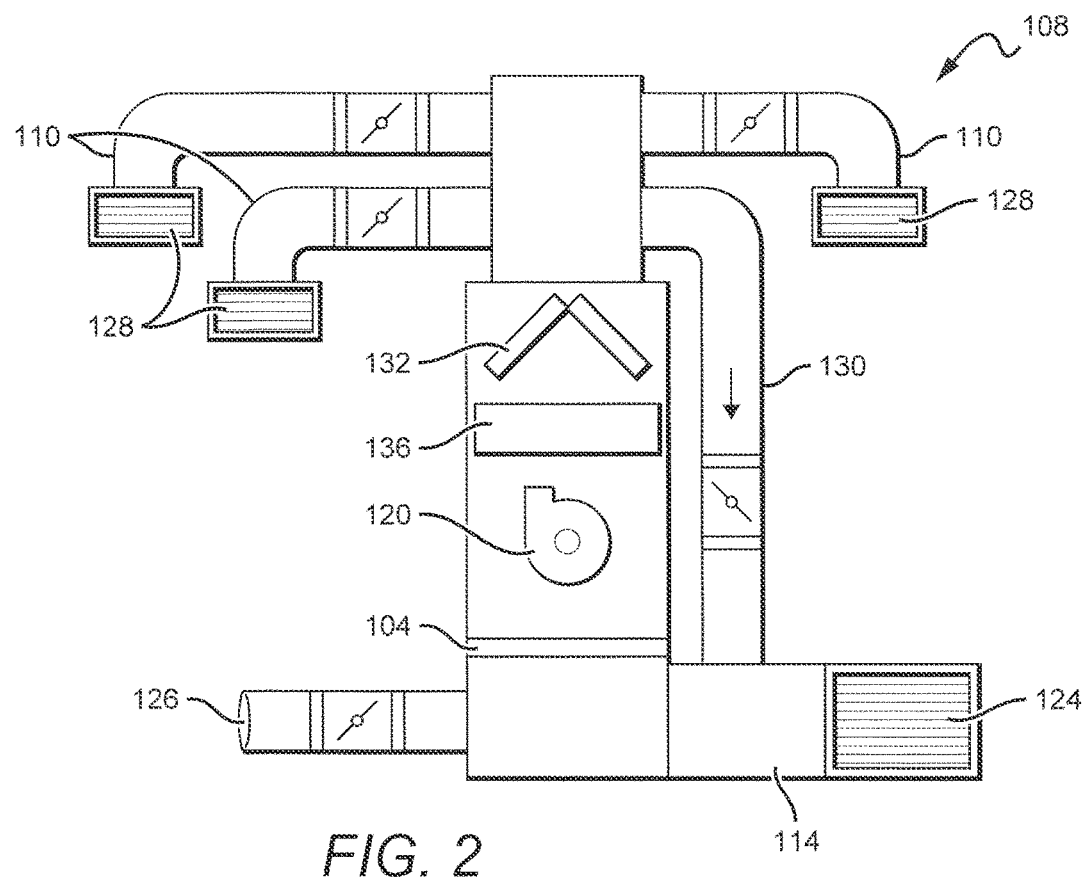
FIG. 2 illustrates a schematic view of an exemplary embodiment of a residential HVAC system comprising a HVAC home air filter in accordance with the present disclosure.

FIG. 2 illustrates a schematic view of an exemplary embodiment of a residential HVAC system 108 that may be used to clean air within residential living spaces 116. The residential HVAC system 108 generally comprises a fan 120 configured to draw a return air stream 124 from the residential living spaces 116 through the air filter 104 whereby airborne molecular contaminants, volatile organic compounds, and other particle contaminants are removed from the air stream. Particle contaminants removed from the return air stream 124 are entrapped in the air filter 104. The fan 120 then pushes a clean air stream 128 through an air conditioning system 132 and a heater core 136 and then into the residential living spaces 116. As will be appreciated, the air conditioning system 132 and the heater core 136 facilitate providing a consistent, comfortable temperature within the residential living spaces 116 by respectively cooling and heating the clean air stream 128, as needed. As further shown in FIG. 2, the return air stream 124 may be combined with an outside air stream 126, as well as with a bypass air stream 130 air stream so as to maintain a desired barometric pressure within the residential HVAC system 108 and within the residential living spaces 116. In some embodiments, an exhaust air stream 134 may be further incorporated into the residential HVAC system 108 so as to maintain the desired barometric pressure and to allow entry of the outside air stream 126.

Figure 3:
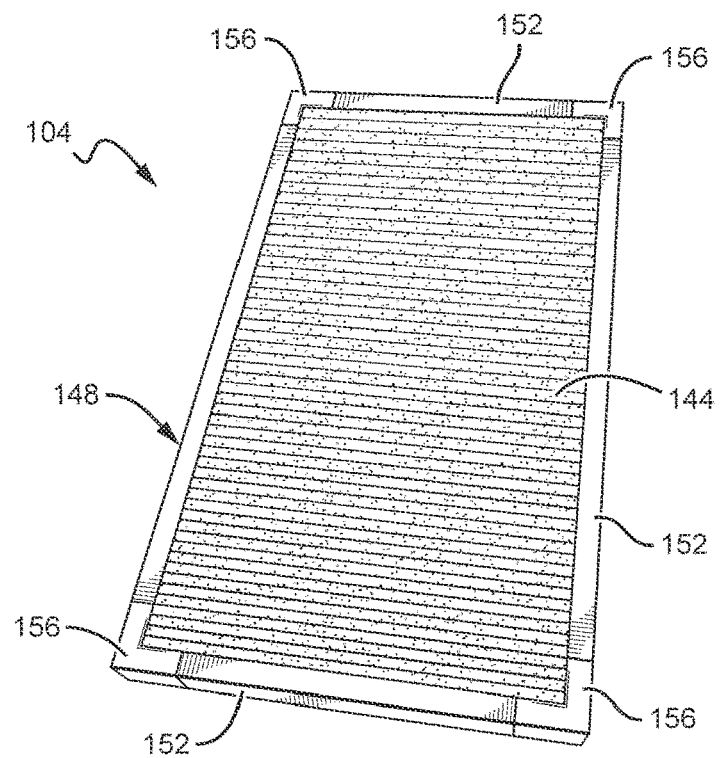
FIG. 3 illustrates an exemplary embodiment of a HVAC home air filter, according to the present disclosure.

FIG. 3 illustrates an exemplary embodiment of an air filter 104 according to the present disclosure. The air filter 104 generally comprises a filter medium 144 retained within a supportive frame 148. The supportive frame 148 is configured to orient the air filter 104 within the residential HVAC system 108 such that the return air stream 124 is directed through the filter medium 144. As such, the supportive frame 148 comprises a shape and size suitable for supporting the air filter 104 within the residential HVAC system 108. It will be appreciated that the shape and size of the supportive frame 148 will vary depending upon a make and model of the residential HVAC system 108 for which the air filter 104 is intended to be used.

The filter medium 144 provides an area to pass an air stream and entrap particulates and other contaminates flowing with the air stream. The filter medium 144 may be comprised of paper, foam, cotton, spun fiberglass, or other known filter materials, woven or non-woven material, synthetic or natural, or any combination thereof. The filter medium 144 may be pleated, or otherwise shaped, or contoured so as to increase the surface area for passing the air stream to be cleaned. Thus, the length of the filter medium 144 may be greater than the length of the air filter 104 generally, due to the pleats, such that the surface area of the filter medium 144 is greater than the surface area of the air filter 104.

In some embodiments, the filter medium 144 may be a composite filter medium comprising one or more media layers, each having unique filtration properties such that the combination of media layers exhibits a relatively high filtration efficiency and a relatively low air pressure drop across the filter medium 144. In the embodiment illustrated in FIGS. 3-4, the filter medium 144 comprises a first media layer and a second media layer. The first media layer comprises a fiber density that is relatively lower than the fiber density of the second media layer. Thus, the filter medium 144 comprises a fiber density that generally increases in the direction of the air flow through the filter medium. In one embodiment, the filter medium 144 exhibits a filtration efficiency of at least 38% and a basis filtration efficiency of substantially 43.3%, as measured by way of a TSI Model 8130 automated filter tester that utilizes a 0.1 μm count median diameter salt (NaCl) aerosol with a flowrate of substantially 85 liters per minute.

The combination of media layers comprising the filter medium 144 generally is lightweight and relatively thin. In one embodiment, the filter medium 144 comprises a basis weight of substantially 3.0 ounces per square yard (ounces/yd$^2$) and a weight range between substantially 2.85 and 3.15 ounces/yd$^2$. In one embodiment, the filter medium comprises a basis weight of substantially 101.7 grams per square meter (gm/m$^2$), and a weight ranging between substantially 96.6 gm/m$^2$ and 106.8 gm/m$^2$. A basis thickness of the filter medium 144 is substantially 0.140 inches, or 3.56 millimeters (mm), and a thickness of the filter medium 144 ranges between substantially 0.100 inches (2.54 mm) and 0.180 inches (4.57 mm).

In one embodiment, the filter medium 144 comprises an air permeability ranging between substantially 410 cubic feet of air per minute per square foot of the filter medium (cfm) and substantially 480 cfm, and comprises a basis air permeability of substantially 445 cfm. In one embodiment, the air permeability of the filter medium 144 ranges between substantially 2.08 cubic meters of air per second per square meter of the filter medium (m$^3$/s-m$^2$) and substantially 2.44 m$^3$/s-m$^2$, and a basis air permeability of the filter medium 144 is substantially 2.26 m$^3$/s-m$^2$.

As will be appreciated, each of the media layers comprising the filter medium 144 generally may have a unique appearance, due at least in part to the different fiber densities discussed above. It is contemplated that, in some embodiments, the unique appearances of the media layers may indicate a preferred direction of air flow through the filter medium 144. For example, in the embodiment illustrated in FIGS. 3-4, the first media layer comprises a gold color and the second media layer comprises a white color. Thus, a first side of the air filter 104 has the gold color, and may indicate an air entry side of the filter, and a second side of the air filter has the white color which may indicate an air exit side of the filter. The colors of the first and second sides of the air filter 104 may serve to ensure a proper installation of the air filter into the residential HVAC system 108, such the fiber density of the filter medium 144 generally increases in the direction of an air flow through the air filter 104.

The supportive frame 148 may comprise various fastening, or supportive, structures and materials suitably configured for securing the air filter 104 within a particular residential HVAC system 108. To this end, in the embodiment illustrated in FIG. 3, the supportive frame 148 comprises a plurality of elongate sections 152 and corner sections 156 disposed along the perimeter edges of the filter medium 144 and configured to support the filter medium 144 within the residential HVAC system 108. In other embodiments, however, the supportive frame 148 may comprise any of various rigid supports, shapes, and recesses configured to orient the air filter 104 within various makes and models of the residential HVAC system 108. It should be understood, therefore, that various structures, shapes, and materials incorporated into the supportive frame 148, and thus the air filter 104 as a whole, may vary depending upon the particular residential HVAC system 108 for which the air filter 104 is intended to be used without detracting from the spirit and scope of the present disclosure.

Figure 4:
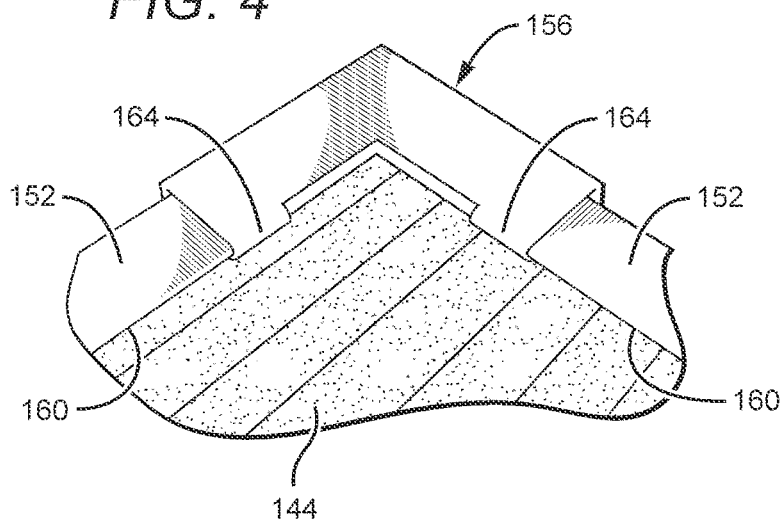
FIG. 4 illustrates a close-up perspective view of a corner of the HVAC home air filter of FIG. 3, in accordance with the present disclosure.

It will be appreciated that the filter medium 144 generally is retained within the supportive frame 148. In the embodiment illustrated in FIGS. 3-4, the elongate sections 152 and corner sections 156 comprise a U-shaped cross-sectional shape, the open side of which forms a recess 160 suitable to receive the perimeter edges of the filter medium 144. Upon assembling the elongate sections 152 and corner sections 156, as shown in FIGS. 3-4, the recess 160 extends along an inside perimeter of the supportive frame 148 thereby retaining the filter medium 144 within the supportive frame. As best shown in FIG. 4, the corner section 156 comprises folded portions 164 disposed on opposite ends of the corner section, as well as on opposing sides of the corner section 156. In the illustrated embodiment, each of the folded portions 156 comprises a tab that is extended toward an interior of the recess 160 and configured to slidably retain an edge of the elongate section 152.

As will be recognized, the folded portions 156 cooperate to retain the elongate sections 152 within the corner section 156, as shown in FIG. 4. It is contemplated that the folded portions 164 grip the elongate sections 152 with a degree of force that allows a practitioner to insert the elongate sections 152 into the corner sections 156, and thereby assemble the supportive frame 148, as shown in FIG. 3, but provides enough friction to maintain an assembled state of the supportive frame 148 during use of the air filter 104. Further, it is envisioned that a sliding relationship between the elongate sections 152 and the corner sections 156 generally facilitates adjusting the length and width of the supportive frame 148 to accommodate variations in the shape and size of ducting within the residential HVAC system 108. For example, it is not uncommon for an air filter that is appropriately sized for a particular residential HVAC system 108 to allow a small gap of unfiltered air to bypass the filter medium due to variations in the assembly of the HVAC system. Upon installing the air filter 104, however, the elongate sections 152 and the corner sections 156 may be adjusted to tailor the length and width of the supportive frame 148, such that substantially all unfiltered air is passed through the filter medium 144.

It is contemplated that any of a variety of fasteners or structures may be implemented so as to retain the filter medium 144 within the supportive frame 148. In some embodiments, the supportive frame 148 may comprise a grate, or a similar structure, which encloses the filter medium 144 within the supportive frame 148 without restricting airflow through the filter medium 144. In some embodiments, the filter medium 144 may be coupled with a wire support configured to resist bowing of the filter medium 144 due to the air stream passing therethrough. For example, the filter medium may be disposed between a first screen and a second screen. In the embodiment illustrated in FIGS. 3-4, the first and second screens are comprised of nylon. In other embodiments, however, the first and second screens may be comprised of a rigid material, such as, by way of non-limiting example, any of various suitable plastics or metals.

In some embodiments, the supportive frame 148 may be molded directly onto the edges of the filter medium 144 so as to retain the filter medium within the frame. In some embodiments, the supportive frame 148 may be molded to the wire supports of the filter medium 144. For example, in those certain embodiments wherein the filter medium 144 is disposed between the first screen and the second screen, the supportive frame 148 may be molded onto the first and second screens to retain the filter medium 144 within the supportive frame 148. Further, in some embodiments, the supportive frame 148 may comprise a crimped portion that folds onto and retains the first and second screens and the filter medium 144 within the supportive frame. It should be recognized, however, that fastening the filter medium 144 to the supportive frame 148 renders the filter medium 144 irremovable from the supportive frame 148. Although the filter medium 144 may be irremovable from the frame in some embodiments, it should be understood that in a preferred embodiment, the filter medium 144 is removable from the supportive frame 148, as described herein, without deviating from the scope of the present disclosure.

It is contemplated that a practitioner may periodically clean the filter medium 144 rather than replacing the air filter 104, as is typically done with conventional air filter systems. It is envisioned that the air filter 104 may be removed from the residential HVAC system 108, and any trapped debris may then be removed from the residential HVAC system 108. The elongate sections 152 and the corner sections 156 may be disassembled so as to release the filter medium 144 from the supportive frame 148 and then a water hose may be used to flush contaminants from the filter medium 144, thereby leaving the filter clean and ready for reuse. In some embodiments, wherein the filter medium 144 comprises a filter oil composition, a solvent may be used to remove the filter oil from the filter medium 144. Once the filter medium 144 has been sufficiently dried, a suitably formulated filter oil composition may be applied and allowed to wick into the filter medium 144. The elongate sections 152 and corner sections 156 may then be assembled onto the filter medium 144, as described above, and the air filter 104 may be reinstalled into the residential HVAC system 108. Various other cleaning methods will be apparent to those skilled in the art without deviating from the spirit and scope of the present disclosure.

In some embodiments, wherein the filter medium 144 comprises the filter oil composition, the filter medium 144 may comprise at least a cotton gauze portion including 4 to 6 layers of cotton gauze disposed between two epoxy-coated aluminum wire screens. As described above, however, the wire screens may be comprised of nylon, or other suitable thermoplastic material. The cotton may be advantageously treated with the above-mentioned filter oil composition so as to cause tackiness throughout microscopic strands comprising the filter medium 144. The nature of the cotton allows high volumes of airflow, and when combined with the tackiness of the filter oil composition creates a powerful filtering medium which ensures a high degree of air filtration.

During operation of the residential HVAC system 108, contaminant particles cling to the fibers within the volume of the filter medium 144 and become part of the filtering medium 144, a process referred to as "depth loading." It will be appreciated that depth loading allows the air filter 104 to capture and retain significantly more contaminants per unit of area than conventional air filters. Contaminant particles are stopped by the layers of cotton gauze and held in suspension by the filter oil composition, and thus the contaminants collected on the surface of the filter medium 144 have little effect on air flow during much of the service life of the air filter 104. Moreover, as the filter medium 144 collects an increasing volume of contaminants and debris, an additional degree of filtering action begins to take place as the return air stream 124 first passes through the trapped contaminants on the surface of the filter medium 144 before passing through deeper layers within the filter medium 144. In essence, the trapped contaminants begin to operate as an additional filter material which precedes the filter medium 144. Thus, the air filter 104 continues to exhibit a high degree of air flow and filtration throughout the service life of the filter, thereby reducing operating costs of the residential HVAC system 108.

As will be appreciated, treating the filter medium 144 with the filter oil composition generally enables the filter medium 144 to capture contaminants by way of interception, whereby contaminants, such as dirt particles, traveling with the return air stream 124 directly contact the fibers comprising the filter medium 144 and are then held in place by the filter oil composition. Larger or heavier particles generally are captured by way of impaction, whereby inertia or momentum of the particles causes them to deviate from the path of the return air stream 124 through the filter medium 144, and instead the particles run straight into the fibers and are captured by the filter oil composition.

Particle contaminants having very small sizes may be captured by way of diffusion. As will be appreciated, small particles are highly affected by forces within the return air stream 124 through the filter medium 144. Forces due to velocity changes, pressure changes, and turbulence caused by other particles, as well as interaction with air molecules, generally causes the small particles to follow random, chaotic flow paths through the filter medium 144. Consequently, the small particles do not follow the return air stream 124, and their erratic motion causes them to collide with the fibers comprising the filter medium 144 and remain captured by the filter oil composition. Diffusion and the filter oil composition enable the air filter 104 to capture particle contaminants having sizes that are much smaller than the openings between the fibers comprising the filter medium 144. Furthermore, the filter oil composition enables the air filter 104 to capture contaminants throughout the volume of the filter medium 144, rather than only on the surface of the filter as is common with conventional air filters. The multiple layers of cotton fibers comprising the filter medium 144 coupled with the tackiness provided by the filter oil composition provide many levels of contaminant retention, thereby enabling the air filter 104 to hold significantly more contaminants per unit of area of the filter medium 144 than is possible with conventional air filters.

As will be appreciated, the filter oil composition of the present disclosure is critical to the enhanced air flow and filtration properties of the air filter 104. In some embodiments, the filter oil composition comprises an oil formulation which is non-reactive, has an excellent oxidation stability, possesses good thermal stability, and retains a suitable viscosity at normal operating temperatures of the residential HVAC system 108. In some embodiments, the filter oil composition may be a mixture of oils and colored dyes suitable for enhancing the tackiness of the filter medium 144, such as by way of non-limiting example, paraffinic oils, polyalphaolefins, and the like. In some embodiments, the filter oil composition comprises a mixture of 96.74% paraffinic oil by volume, 3.20% polyalphaolefin (PAO) by volume, and 0.06% colored dye by volume. In some embodiments, the filter oil composition has a viscosity at 100 degrees-C. ranging between substantially 7.2 and 7.6 centistokes (cSTs). It is to be understood that the particular oils and dyes, as well as their colors and viscosities, as well as their individual concentrations within the filter oil composition may be altered without deviating from the spirit and the scope of the present disclosure.

In some embodiments, the layers of cotton gauze treated with the filter oil composition may be coupled with portions of the filter medium 144 wherein other filtration mechanisms are used, thereby forming a composite filter medium 144 capable of removing airborne molecular contaminants and VOCs from the return air stream 124. In some embodiments, the composite filter medium 144 may be comprised of a cotton gauze portion, as described herein, and an electrostatic portion.

Figure 5:
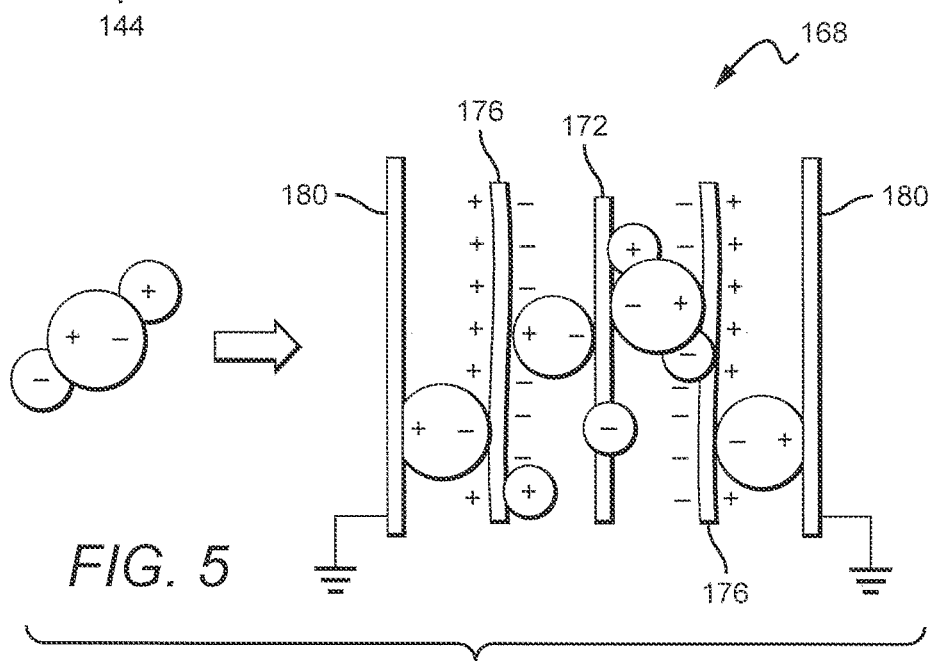
FIG. 5 illustrates a cross-sectional view of an exemplary embodiment of a portion of a composite filter medium configured for entrapping particle contaminants by way of electrostatic attraction and agglomeration.

FIG. 5 illustrates a cross-sectional view of an electrostatic portion 168 of the composite filter medium 144 which may be disposed downstream of the cotton gauze portion and configured for utilizing electrostatic attraction and agglomeration to entrap particle contaminants. The embodiment of FIG. 5 may be configured to entrap contaminant particles possessing diameters on the order of substantially 0.3 microns. The electrostatic portion 168 of the composite filter medium 144 comprises a central screen 172 configured to be electrically charged to a high electrostatic potential. In some embodiments, the central screen 172 may be positively charged to substantially 7,000 VDC. The central screen 172 may be covered on each side by at least one layer of fibers 176 capable of being electrically polarized. As shown in FIG. 5, each of the at least one layer of polarizable fibers 176 may be covered by an exterior grounded wire screen 180. It will be appreciated that upon positively charging the central screen 172, the polarizable fibers 176 operate to polarize incoming particle contaminants within the return air stream 124, thereby causing the contaminants to become electrostatically attracted to the polarizable fibers 176. Thus, particle contaminants that would otherwise avoid directly colliding with the fibers 176 are electrostatically captured and entrapped within the filter medium 144.

Figure 6:
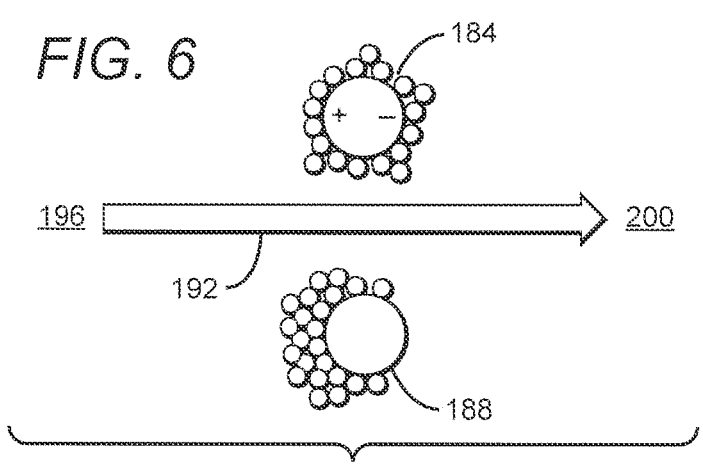
FIG. 6 illustrates cross-sectional views of an exemplary embodiment of a polarized fiber and an unpolarized passive fiber being exposed to particle contaminants within an air stream flowing from an upstream area to a downstream area.

FIG. 6 illustrates cross-sectional views of a polarized fiber 184 and an unpolarized passive fiber 188 being exposed to particle contaminants within an air stream 192 that flows from an upstream area 196 to a downstream area 200. As shown in FIG. 6, electrostatic attraction between the particle contaminants and the polarized fiber 184 uniformly distributes the contaminants on the surface of the polarized fiber 184. The electrostatic attraction ensures the capture of contaminants that would otherwise pass by the fiber 184 without a direct collision and continue flowing to the downstream area 200. Unlike the polarized fiber 184, the unpolarized passive fiber 188 relies solely upon direct collisions between the particle contaminants and the fiber, thus allowing non-colliding contaminants to continue flowing to the downstream area 200.

As further illustrated in FIG. 6, the contaminants that collide with the passive fiber 188 tend to accumulate on an upstream side of the passive fiber 188. It will be appreciated that as the accumulation of contaminants on the upstream side of the passive fiber 188 grows, the air stream 192 becomes proportionally restricted. Thus, filter media comprising unpolarized passive fibers 188 are prone to clogging and greater loading than generally occurs with filter media comprising polarized fibers 184. Experimental testing to determine a relationship between fine dust loading and a consequent drop in pressure across each of several air filter devices has clearly demonstrated that filter media comprising polarized fibers 184 entrap more contaminants with a lower pressure drop across the filter than is otherwise possible with conventional filter media comprising only unpolarized passive fibers 188.

In some embodiments, at least some of the fibers comprising the composite filter medium 144 may be treated with a coating of antimicrobial molecules configured to destroy microbes on contact. Preferably, the coating of antimicrobial molecules surrounds substantially the entire circumference of each fiber strand that is treated. In some embodiments, the antimicrobial molecules may comprise positively charged molecules that are configured to cooperate with the polarized fibers 176 of the composite filter medium 144. It is contemplated that since many microbes and VOCs are negatively charged, incorporating the antimicrobial molecules into the composite filter medium 144 may electrostatically capture the particle contaminants, thereby enabling the air filter 104 to remove particles from the return air stream 124 as small as 0.001 microns in diameter, or smaller, such as many odors, irritants, toxic compounds, and the like.

In some embodiments, fibrous materials comprising a portion of the composite filter medium 144 may comprise at least one substance configured to release a fragrance into air passing through the composite filter medium. Thus, in some embodiments, the air filter 104 may be configured to introduce a desired aroma into the residential living spaces 116. It is contemplated that various HVAC home air filters 104 may comprise different fragrances, thereby enabling a user to select the air filter 104 according to a desired aroma. In some embodiments, a particular scent or aroma may be distributed through the residential HVAC system 108 into the residential living spaces 116 so as to provide an aroma therapy by way of the air filter 104.

In some embodiments, the substances configured to release a fragrance may be incorporated into the composite filter medium 144 comprising the antimicrobial molecules. Thus, in some embodiments, the composite filter medium 144 may utilize treated cotton gauze and electrostatic attraction to entrap particle contaminants while simultaneously releasing an aroma into the residential living spaces 116. It will be appreciated, however, that the substances for releasing a fragrance preferably are located within the composite filter medium 144 downstream of the antimicrobial molecules so as to avoid destruction of aromatic molecules by the antimicrobial molecules.

It is contemplated that the fragrance may be any natural substance, synthetic material, (incorporating aldehydes, ketones, esters, and other chemical constituents), or combinations thereof which is known in the art and suitable for use in candles for imparting an odor, aroma, or fragrance. In some embodiments, suitable natural and synthetic fragrance/flavor substances may include those compiled by the U.S. Food and Drug Administration in Title 21 of the Code of Federal Regulations, Sections 172.510 and 172.515 respectively. In some embodiments, suitable fragrances may comprise spice oil, flower oil, fruit oil, and the like. In some embodiments, suitable fragrances may comprise fragrance components, such as for example benzaldehydes, phenols, cinnamic aldehydes and esters, octadienes, dienes, cyclohexadienes, terpenes, and the like. Further details regarding dispersion of aromas by way of air filters and fragrance compositions are disclosed in U.S. patent application Ser. No. 10/544,157, entitled "Vehicle cabin air filter freshener," filed on Aug. 13, 2003, the entirety of each of which is incorporated herein by reference.

It should be understood that the air filter 104 is not limited solely to treating air within buildings and detached residential homes, but rather may be used for vehicle passenger cabins wherein passengers, drivers, as well as occupants reside, such as by way of non-limiting example, automobiles, trucks, recreational vehicles, buses, earthmoving equipment and tractors with enclosed cabins, crane operator cabins, various cargo moving vehicles, locomotives, rail passenger cars, airplanes, helicopters, ship cabins, airship cabins, and the like. Moreover, the air filter 104 may be incorporated into HVAC systems other than as illustrated in FIG. 1, such as by way of non-limiting example, central HVAC systems, rooftop HVAC systems, wall-mounted HVAC systems, as well as portable HVAC systems, and the like.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A method for air filter to clean air within residential spaces, comprising:
    forming a composite filter medium comprising a first media layer coupled with a second media layer; and
    disposing a frame for supporting the filter medium within the HVAC system, the frame including a plurality of elongate sections and a plurality of corner sections each of the plurality of elongate sections and the plurality of corner sections comprise a U-shaped cross-sectional shape configured to slidably receive an outer edge of the filter medium wherein the frame is disposed along a perimeter of the composite filter medium for orienting the air filter within a residential HVAC wherein the plurality of corner sections are configured to receive an end of an elongate section.

2. The method of claim 1, wherein forming the composite filter medium includes disposing the filter composite filter medium between a first screen and a second screen.

3. The method of claim 2, wherein forming the composite filter medium includes forming either or both of the first screen and the second screen of a rigid material.

4. The method of claim 3, wherein forming the composite filter medium includes co-pleating either or both of the first screen and the second screen with either or both of the first media layer and the second media layer.

5. The method of claim 4, wherein disposing the frame includes incorporating a grate that encloses the first media layer and the second media layer without restricting airflow.

6. The method of claim 5, wherein disposing the frame includes crimping or molding the frame directly onto edges of the first media layer and the second media layer.

7. The method of claim 5, wherein disposing the frame includes crimping or molding the frame onto edges of the grate that encloses the first media layer and the second media layer.

\* \* \* \* \*